United States Patent
Hung et al.

(10) Patent No.: US 10,168,732 B2
(45) Date of Patent: Jan. 1, 2019

(54) TOUCH PANEL AND SENSING METHOD THEREOF

(71) Applicant: Industrial Technology Research Institute, Hsinchu (TW)

(72) Inventors: Che-Yi Hung, Hsinchu (TW); Chien-Ju Lee, Taoyuan County (TW); Heng-Yin Chen, Hsinchu County (TW)

(73) Assignee: Industrial Technology Research Institute, Hsinchu (TW)

( * ) Notice: Subject to any disclaimer, the term of this patent is extended or adjusted under 35 U.S.C. 154(b) by 497 days.

(21) Appl. No.: 14/527,776

(22) Filed: Oct. 30, 2014

(65) Prior Publication Data

US 2015/0242022 A1 Aug. 27, 2015

Related U.S. Application Data

(60) Provisional application No. 61/945,141, filed on Feb. 27, 2014.

(30) Foreign Application Priority Data

Jul. 18, 2014 (TW) .............................. 103124778 A

(51) Int. Cl.
*G06F 1/16* (2006.01)
*G06F 3/041* (2006.01)
*G06F 3/044* (2006.01)

(52) U.S. Cl.
CPC ............ *G06F 1/1615* (2013.01); *G06F 3/044* (2013.01); *G06F 3/0416* (2013.01)

(58) Field of Classification Search
CPC ...... G06F 1/1615; G06F 3/0416; G06F 3/044; G06F 1/1652; G06F 2203/04102; G06F 3/041; H03K 2217/960775
See application file for complete search history.

(56) References Cited

U.S. PATENT DOCUMENTS 8,502,788 B2 8/2013 Cho
9,454,274 B1 * 9/2016 Kurikawa ............. G06F 3/0416
(Continued)

FOREIGN PATENT DOCUMENTS

CN 101369207 8/2012
CN 102880338 1/2013
(Continued)

OTHER PUBLICATIONS

Tada et al.,"A Flexible and Stretchable Tactile Sensor utilizing Static Electricity," IEEE/RSJ International Conference on Intelligent Robots and Systems, Oct. 29, 2007-Nov. 2, 2007, pp. 684-689.
(Continued)

*Primary Examiner* — Patrick N Edouard
*Assistant Examiner* — Douglas M Wilson
(74) *Attorney, Agent, or Firm* — JCIPRNET

(57) ABSTRACT

A touch panel and a sensing method thereof are provided. The sensing method includes: sensing a touch operation on a touch panel, and getting a touch trajectory of the touch operation. When the touch operation is occurred in a first sensing area, positions of the touch operation are co-located by first sensing electrodes and second sensing electrodes of the first sensing area. When the touch operation is occurred in a second sensing area, positions of the touch operation are co-located by third sensing electrodes and fourth sensing electrodes of the second sensing area. When the touch operation is occurred between the first sensing area and the second sensing area, positions of the touch operation are co-located by the first sensing electrodes and the third sensing electrodes.

5 Claims, 15 Drawing Sheets

(56) References Cited

U.S. PATENT DOCUMENTS

| | | | |
|---|---|---|---|
| 2009/0322689 A1* | 12/2009 | Kwong | G06F 3/04883 345/173 |
| 2010/0156811 A1 | 6/2010 | Long et al. | |
| 2011/0210937 A1 | 9/2011 | Kee et al. | |
| 2012/0120006 A1* | 5/2012 | Liu | G06F 3/044 345/173 |
| 2012/0162099 A1* | 6/2012 | Yoo | G06F 3/0412 345/173 |
| 2012/0229416 A1 | 9/2012 | Ku et al. | |
| 2013/0015906 A1* | 1/2013 | Yeh | G06F 3/0416 327/517 |
| 2014/0028597 A1 | 1/2014 | Cho et al. | |
| 2014/0043251 A1* | 2/2014 | Wilson | G06F 3/041 345/173 |
| 2014/0132553 A1* | 5/2014 | Park | G06F 3/044 345/174 |
| 2015/0077647 A1* | 3/2015 | Chiou | G06F 3/044 349/12 |
| 2015/0116256 A1* | 4/2015 | Hsu | G06F 3/044 345/174 |
| 2015/0179122 A1* | 6/2015 | Brown | G06F 3/0416 345/174 |
| 2015/0205405 A1* | 7/2015 | Yumoto | G06F 3/044 345/174 |

FOREIGN PATENT DOCUMENTS

| | | |
|---|---|---|
| TW | 201013486 | 4/2010 |
| TW | 201133319 | 10/2011 |
| WO | 2012062062 | 5/2012 |

OTHER PUBLICATIONS

Serikawa et al., "Proposal of a Touch Panel Switch with the Function of Bending and Addition-One of a New User Interface," 2011 International Conference on Instrumentation, Communication, Information Technology and Biomedical Engineering, Nov. 8-9, 2011, pp. 8-13.

Ko et al., "Low Noise Capacitive Sensor for Multi-touch Mobile handset's applications," 2010 IEEE Asian Solid State Circuits Conference (A-SSCC), Nov. 8-10, 2010, pp. 1-4.

Ho et al., "Simple Single-Layer Multi-Touch Projected Capacitive Touch Panel," SID Symposium Digest of Technical Papers, Jun. 2009, pp. 447-450.

Miyata et al., "Proposal of Flexible Touch Panel Sensor," ACIS International Conference on Software Engineering, Artificial Intelligence, Networking and Parallel/Distributed Computing, Jul. 1-3, 2013. pp. 615-620.

Westing et al., "Integrating Multi-touch in High-Resolution Display Environments," 2011 International Conference for High Performance Computing, Networking, Storage and Analysis (SC), Nov. 12-18, 2011, pp. 1-9.

"Office Action of Taiwan Counterpart Application", dated Feb. 15, 2016, p. 1-p. 7.

* cited by examiner

TOUCH PANEL AND SENSING METHOD THEREOF

CROSS-REFERENCE TO RELATED APPLICATION

This application claims the priority benefits of U.S. provisional application Ser. No. 61/945,141, filed on Feb. 27, 2014 and Taiwan application serial no. 103124778, filed on Jul. 18, 2014. The entirety of each of the above-mentioned patent applications is hereby incorporated by reference herein and made a part of this specification.

BACKGROUND

Technical Field

The disclosure relates to a touch panel and a sensing method thereof, and particularly relates to a foldable touch panel and a sensing method thereof.

Related Art

In recent years, touch technology is quickly developed, and due to advantages of easy operation and less space occupation, etc., the touch technology is widely applied in various electronic products. However, in application of a general flexible touch panel, electrode structures disposed at a folding portion of the touch panel are probably damaged due to a long time bending or folding usage of the touch panel, which may cause increase of overall resistance values sensed by the touch panel. Moreover, if the resistance values of the electrode structures of the touch panel are increased to a certain value, a touch signal probably cannot be transmitted, which may cause malfunction of the touch panel. Therefore, how to improve durability of the flexible touch panel for the long time bending or folding usage is an important issue to be developed.

SUMMARY

The disclosure is directed to a foldable touch panel, which has better durability for long time bending or folding usage.

An exemplary embodiment of the disclosure provides a touch panel including a substrate, a plurality of first sensing electrodes, a plurality of second sensing electrodes, a plurality of third sensing electrodes, a plurality of fourth sensing electrodes, a first control unit and a second control unit. The substrate has a first sensing area, a second sensing area and a middle axis, the first sensing area and the second sensing area are spaced by a gap, and the middle axis is configured between the first sensing area and the second sensing area. The first sensing electrodes and the second sensing electrodes are extendedly disposed in the first sensing area, the first sensing electrodes and the second sensing electrodes are intersected to each other, and the first sensing electrodes are disposed along an extending direction of the middle axis. The third sensing electrodes and the fourth sensing electrodes are extendedly disposed in the second sensing area, the third sensing electrodes and the fourth sensing electrodes are intersected to each other, and the third sensing electrodes are disposed along the extending direction of the middle axis. The first control unit is electrically connected to the first sensing electrodes and the second sensing electrodes, and is electrically connected to a part of the third sensing electrodes located adjacent to the first sensing area selectively. The second control unit is electrically connected to the third sensing electrodes and the fourth sensing electrodes, and is electrically connected to a part of the first sensing electrodes located adjacent to the second sensing area selectively.

An exemplary embodiment of the disclosure provides a touch panel including a substrate, a plurality of first sensing electrodes, a plurality of second sensing electrodes, a plurality of third sensing electrodes, a plurality of fourth sensing electrodes and a first control unit. The substrate has a first sensing area, a second sensing area and a middle axis, the first sensing area and the second sensing area are spaced by a gap, and the middle axis is configured between the first sensing area and the second sensing area. The first sensing electrodes and the second sensing electrodes are extendedly disposed in the first sensing area, the first sensing electrodes and the second sensing electrodes are intersected to each other, and the first sensing electrodes are disposed along an extending direction of the middle axis. The third sensing electrodes and the fourth sensing electrodes are extendedly disposed in the second sensing area, the third sensing electrodes and the fourth sensing electrodes are intersected to each other, and the third sensing electrodes are disposed along the extending direction of the middle axis, and the third sensing electrode located adjacent to the first sensing area is adapted to be divided into a plurality of sub third sensing electrodes, the sub third sensing electrodes are independent to each other. The first control unit is electrically connected to the first sensing electrodes and the second sensing electrodes.

An exemplary embodiment of the disclosure provides a sensing method of touch panel, which includes following steps. A touch panel is provided and a touch operation performed on the touch panel is sensed, and a touch trajectory corresponding to the touch operation is obtained. When the touch operation is occurred in a first sensing area, a position of the touch operation is co-located by a first sensing electrode and a second sensing electrode of the first sensing area. When the touch operation is occurred in a second sensing area, the position of the touch operation is co-located by a third sensing electrode and a fourth sensing electrode of the second sensing area. When the touch operation is occurred between the first sensing area and the second sensing area, the position of the touch operation is co-located by the first sensing electrode and the third sensing electrode.

According to the above descriptions, in the exemplary embodiments of the disclosure, the touch panel is divided into the first sensing area and the second sensing area, where the first sensing area and the second sensing area are spaced by a gap, and are folded along the extending direction of the middle axis to form a folding axis, and the folding axis is located between the first sensing area and the second sensing area. In this way, the touch panel still maintains integrity of the electrode structures and prevent the same from being damaged under a long time bending or folding usage, so as to achieve better durability. Moreover, the exemplary embodiments of the disclosure further provides a sensing method for the aforementioned touch panel, by which coordinates of touch operations in the first sensing area, the second sensing area and between the first sensing area and the second sensing area are effectively sensed.

In order to make the aforementioned and other features and advantages of the disclosure comprehensible, several exemplary embodiments accompanied with figures are described in detail below.

BRIEF DESCRIPTION OF THE DRAWINGS

The accompanying drawings are included to provide a further understanding of the disclosure, and are incorporated

DETAILED DESCRIPTION OF DISCLOSED EMBODIMENTS

Figure 1:
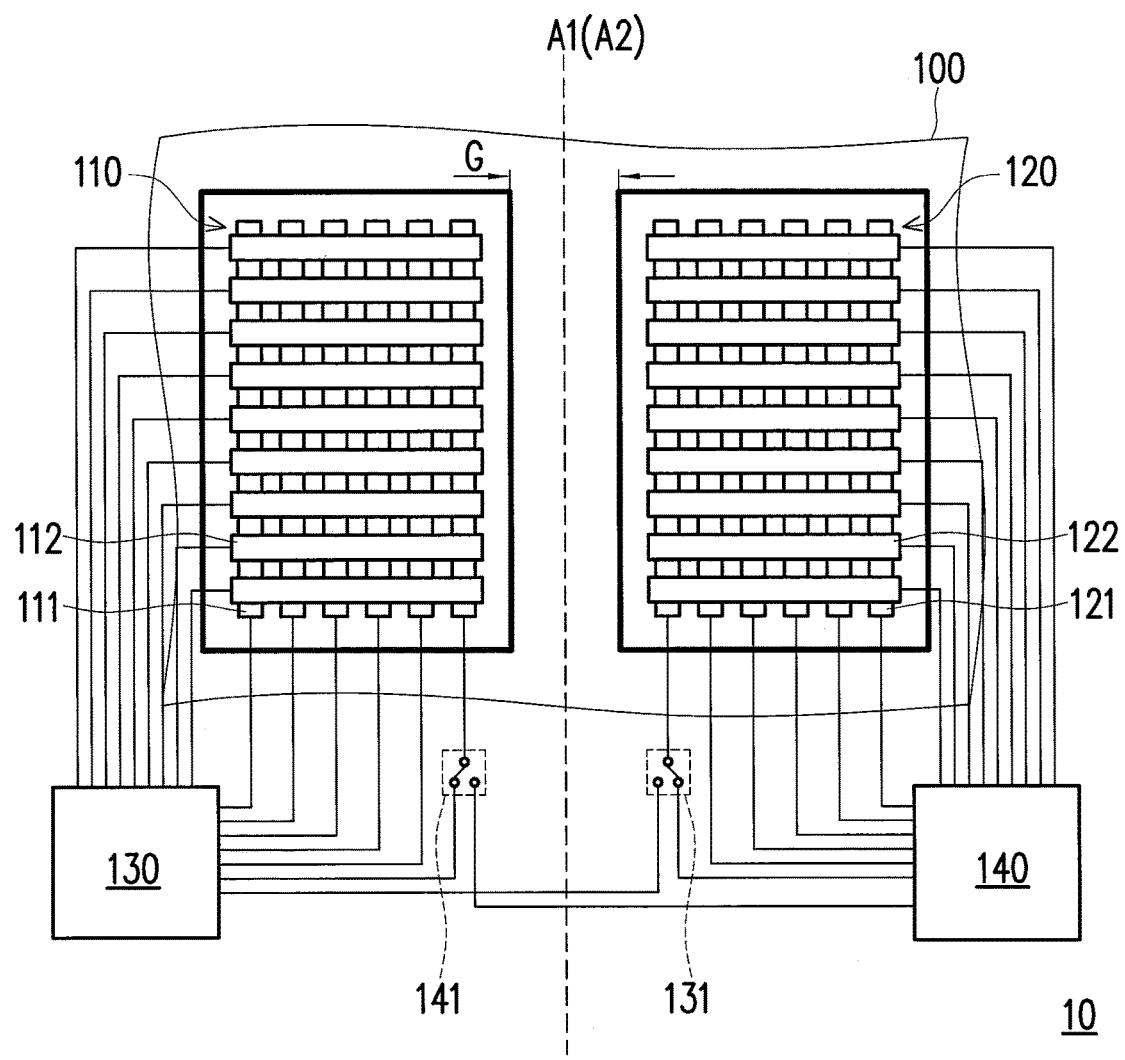
FIG. 1 is a schematic diagram of a touch panel according to an embodiment of the disclosure.

FIG. 1 is a schematic diagram of a touch panel according to an embodiment of the disclosure. Referring to FIG. 1, the touch panel 10 of the present embodiment includes a substrate 100, a plurality of first sensing electrodes 111, a plurality of second sensing electrodes 112, a plurality of third sensing electrodes 121, a plurality of fourth sensing electrodes 122, a first control unit 130 and a second control unit 140.

In detail, the substrate 100 has a first sensing area 110, a second sensing area 120 and a middle axis A1, the first sensing area 110 and the second sensing area 120 are spaced by a gap G, and the middle axis A1 is configured between the first sensing area 110 and the second sensing area 120. The first sensing electrodes 111 and the second sensing electrodes 112 are extendedly disposed in the first sensing area 110, where the first sensing electrodes 111 and the second sensing electrodes 112 are intersected to each other, and the first sensing electrodes 111 are disposed along an extending direction of the middle axis A1. The third sensing electrodes 121 and the fourth sensing electrodes 122 are extendedly disposed in the second sensing area 120, where the third sensing electrodes 121 and the fourth sensing electrodes 122 are intersected to each other, and the third sensing electrodes 121 are disposed along the extending direction of the middle axis A1. Moreover, the touch panel 10 is folded along the extending direction of the middle axis A1 to form a folding axis A2, and the folding axis A2 is located between the first sensing area 110 and the second sensing area 120. It should be noticed that for simplicity's sake, although the middle axis A1 coincided with the folding axis A2 is illustrated in figures for description, the disclosure is not limited thereto, and the middle axis A1 and the folding axis A2 can be not coincided with each other. The first control unit 130 is electrically connected to the first sensing electrodes 111 and the second sensing electrodes 112, and is electrically connected to a part of the third sensing electrodes 121 located adjacent to the first sensing area 110 selectively. The second control unit 140 is electrically connected to the third sensing electrodes 121 and the fourth sensing electrodes 122, and is electrically connected to a part of the first sensing electrodes 111 located adjacent to the second sensing area 120 selectively.

It should be noticed that shapes and numbers of the sensing electrodes 111, 112, 121 and 122 shown in FIG. 1, and area ratios between the first sensing area 110, the second sensing area 120 and the touch panel 10 are only used as an example, and are not used to be limiting of the disclosure. In following descriptions, a situation that the sensing electrodes 111, 112, 121 and 122 all have a strip shape, area sizes of the first sensing area 110 and the second sensing area 120 are the same, the numbers of the first sensing electrodes 111 and the third sensing electrodes 121 are the same, and the numbers of the second sensing electrodes 112 and the fourth sensing electrodes 122 are the same is taken as an example for descriptions.

Figure 2:
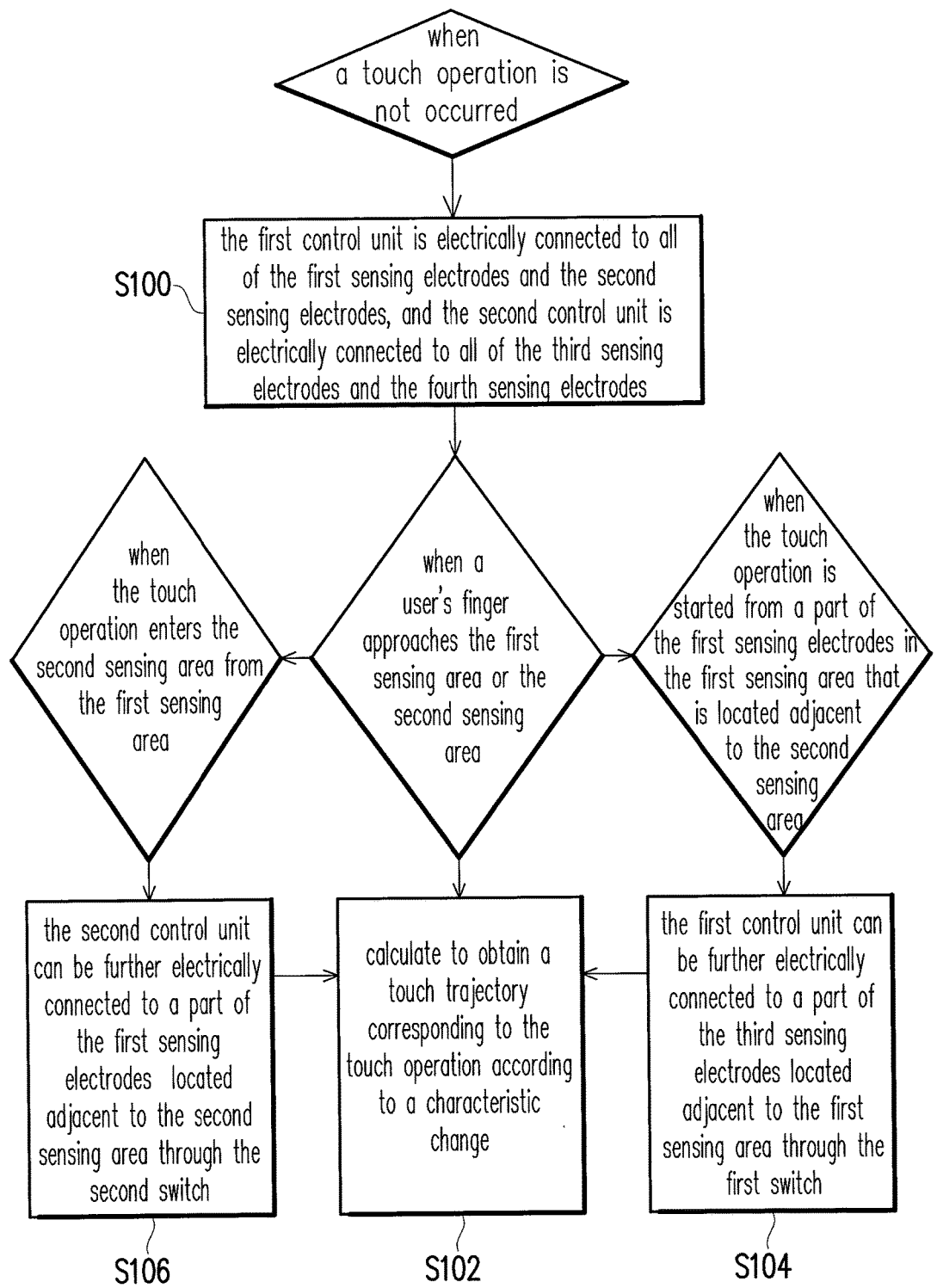
FIG. 2 is a flowchart illustrating a sensing method for the touch panel of FIG. 1.

In detail, FIG. 2 is a flowchart illustrating a sensing method for the touch panel of FIG. 1. Referring to FIG. 1 and FIG. 2, generally, when a touch operation is not occurred, in step S100, the first control unit 130 is electrically connected to all of the first sensing electrodes 111 and the second sensing electrodes 112, and the second control unit 140 is electrically connected to all of the third sensing electrodes 121 and the fourth sensing electrodes 122, and the first control unit 130 and the second control unit 140 respectively provide a scan signal to the first sensing electrodes 111 and the third sensing electrodes 121, or the first control unit 130 and the second control unit 140 respectively provide a scan signal to the second sensing electrodes 112 and the fourth sensing electrodes 122.

When the touch operation is occurred in the first sensing area 110 or the second sensing area 120, in step S102, for example, when a user's finger approaches the first sensing area 110 or the second sensing area 120, capacitance values between the first sensing electrodes 111 and the second sensing electrodes 112, or between the third sensing electrodes 121 and the fourth sensing electrodes 122 are changed due to the touch operation. The first control unit 130 and the second control unit 140 can calculate to obtain a touch trajectory corresponding to the touch operation according to a characteristic change, for example, a change of the capacitance values.

Further, the touch panel 10 of the present embodiment may further include at least one first switch 131 and at least one second switch 141, where the first control unit 130 is electrically connected to a part of the third sensing electrodes 121 through the first switch 131 selectively, and the second control unit 140 is electrically connected to a part of the first sensing electrodes 111 through the second switch 141 selectively. Particularly, when the first control unit 130 is electrically connected to a part of the third sensing electrodes 121 located adjacent to the first sensing area 110 selectively, and the second control unit 140 is electrically connected to a part of the first sensing electrodes 111 located adjacent to the second sensing area 120 selectively, coordinates of the touch operation performed in the first sensing area 110, the second sensing area 120, and between the first sensing area 110 and the second sensing area 120 can be effectively sensed.

For example, in step S104, when the touch operation is started from a part of the first sensing electrodes 111 in the first sensing area 110 that is located adjacent to the second sensing area 120, the first control unit 130 can be further electrically connected to a part of the third sensing electrodes 121 located adjacent to the first sensing area 110 through the first switch 131, and the first control unit 130 can calculate to obtain the touch trajectory corresponding to the touch operation according to a characteristic change, for example, a change of the capacitance values, between the first sensing electrodes 111 and the second sensing electrodes 112, and between the third sensing electrodes 121 and the second sensing electrodes 112.

Moreover, in step S106, when the touch operation crosses over the middle axis A1 and enters the second sensing area 120 from the first sensing area 110, the second control unit 140 can be further electrically connected to a part of the first sensing electrodes 111 located adjacent to the second sensing area 120 through the second switch 141, and the second control unit 140 can calculate to obtain the touch trajectory corresponding to the touch operation according to a characteristic change, for example, a change of the capacitance values, between the third sensing electrodes 121 and the fourth sensing electrodes 122, and between the first sensing electrodes 111 and the fourth sensing electrodes 122.

In the present embodiment, the first sensing area 110 and the second sensing area 120 of the touch panel 10 are spaced by the gap G, and the touch panel 10 is folded along the extending direction of the middle axis A1 to form the folding axis A2, and the folding axis A2 is located between the first sensing area 110 and the second sensing area 120. In this way, even if under a long time bending or folding usage, the touch panel 10 can still maintain integrity of the electrode structure and prevent the same from being damaged, so as to achieve better durability. Moreover, the sensing method adapted to the touch panel 10 is further provided, by which when the touch operation is started from a part of the first sensing electrodes 111 in the first sensing area 110 that is located adjacent to the second sensing area 120, the first control unit 130 can be further electrically connected to a part of the third sensing electrodes 121 located adjacent to the first sensing area 110 through the first switch 131, and the first control unit 130 can calculate to obtain the touch trajectory corresponding to the touch operation according to a characteristic change, for example, a change of the capacitance values, between the first sensing electrodes 111 and the second sensing electrodes 112, and between the third sensing electrodes 121 and the second sensing electrodes 112. When the touch operation crosses over the middle axis A1 and enters the second sensing area 120 from the first sensing area 110, the second control unit 140 can be further electrically connected to a part of the first sensing electrodes 111 located adjacent to the second sensing area 120 through the second switch 141, and the second control unit 140 can calculate to obtain the touch trajectory corresponding to the touch operation according to a characteristic change, for example, a change of the capacitance values, between the third sensing electrodes 121 and the fourth sensing electrodes 122, and between the first sensing electrodes 111 and the fourth sensing electrodes 122. In this way, coordinates of the touch operations in the first sensing area 110, the second sensing area 120 and between the first sensing area 110 and the second sensing area 120 can be effectively sensed.

Figure 3:
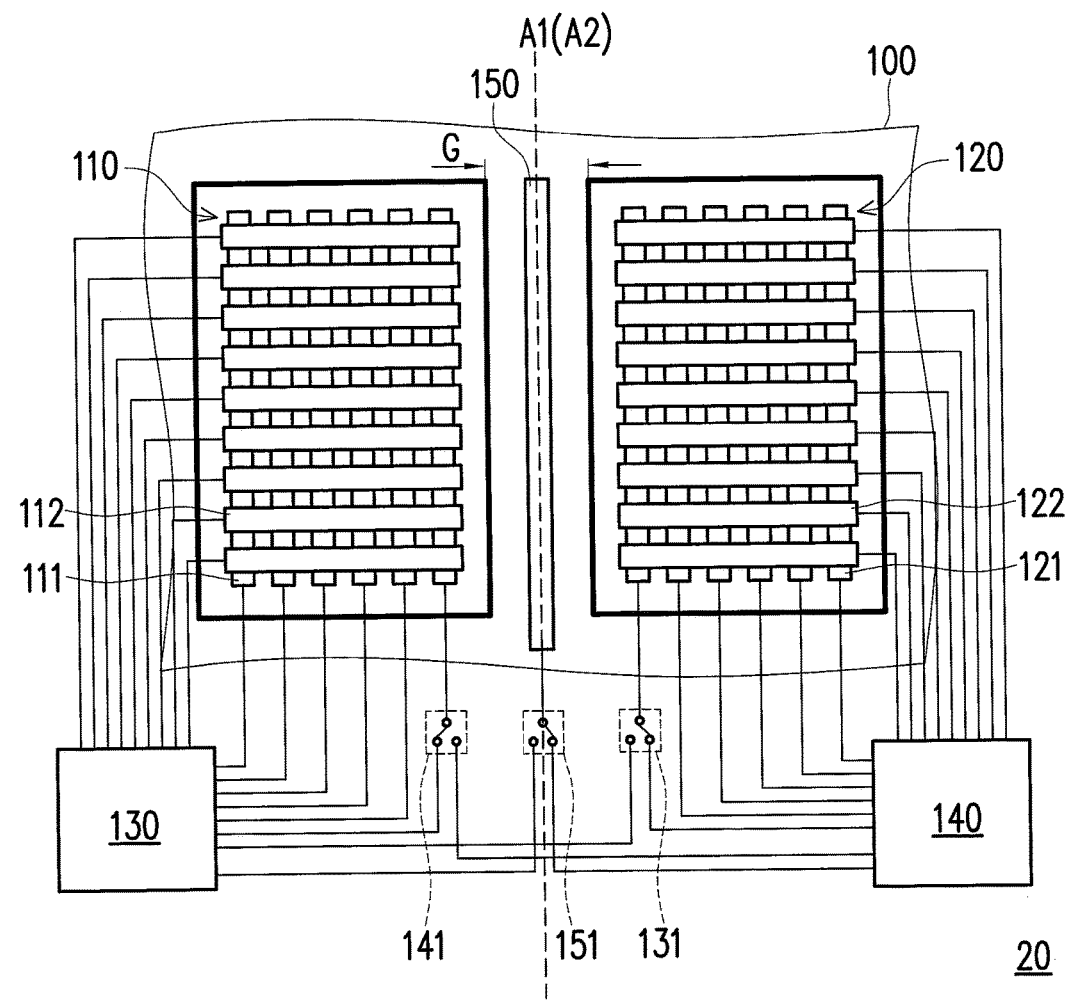
FIG. 3 is a schematic diagram of a touch panel according to another embodiment of the disclosure.

FIG. 3 is a schematic diagram of a touch panel according to another embodiment of the disclosure. Referring to FIG. 3, in the present embodiment, the touch panel 20 is similar to the touch panel 10, and the similar components are denoted by the same referential numbers and have similar functions, and details thereof are not repeated. A main difference between the touch panel 20 and the touch panel 10 is that the touch panel 20 further includes a border electrode 150 and a third switch 151, where the border electrode 150 is disposed parallel to the extending direction of the middle axis A1, and is located between the first sensing area 110 and the second sensing area 120, and the border electrode 150 is selectively connected to the first control unit 130 or the second control unit 140 through the third switch 151.

Figure 4:
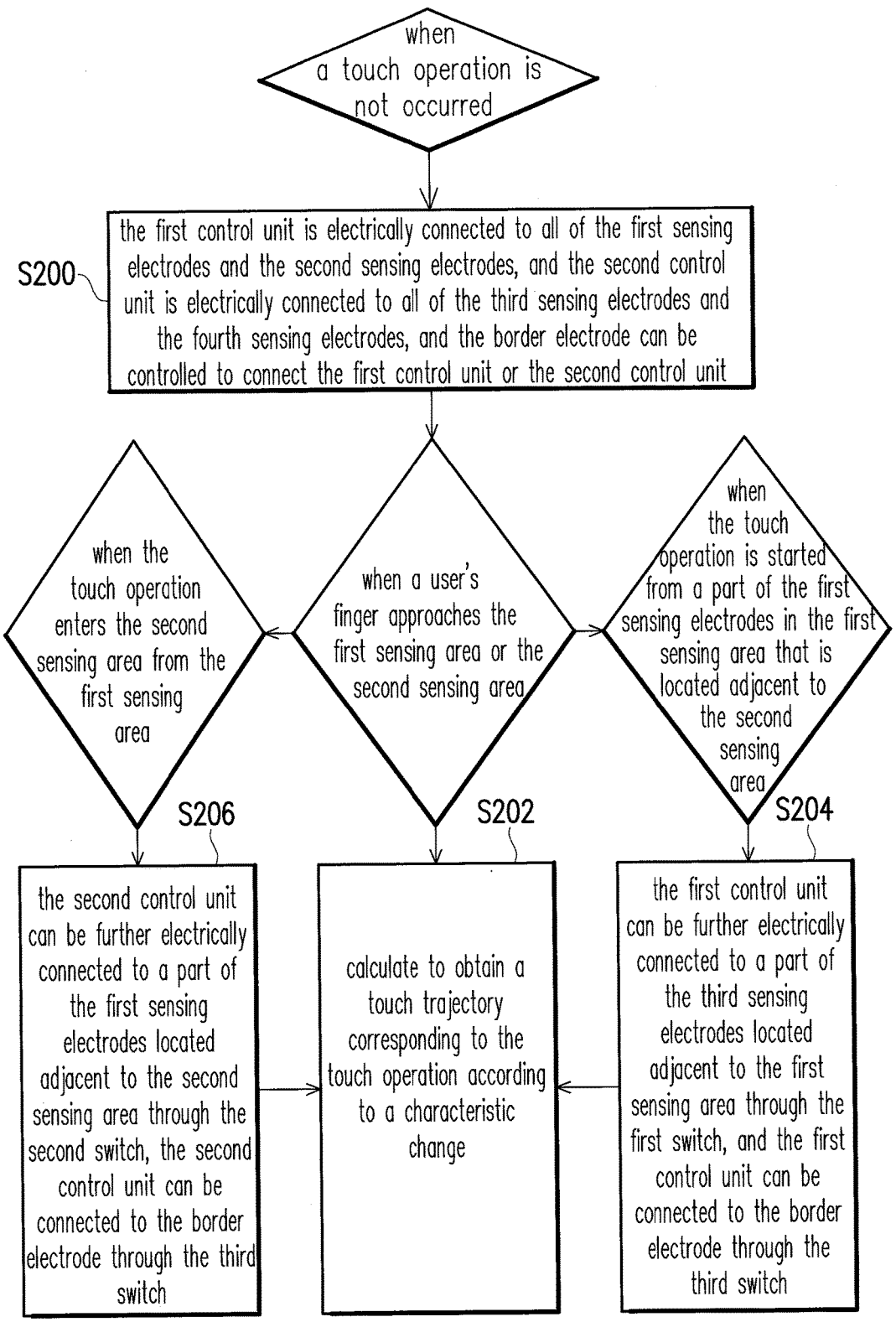
FIG. 4 is a flowchart illustrating a sensing method of the touch panel of FIG. 3.

FIG. 4 is a flowchart illustrating a sensing method of the touch panel of FIG. 3. Referring to FIG. 3 and FIG. 4, generally, when the touch operation is not occurred, in step S200, the first control unit 130 is electrically connected to all of the first sensing electrodes 111 and the second sensing electrodes 112, and the second control unit 140 is electrically connected to all of the third sensing electrodes 121 and the fourth sensing electrodes 122, and the border electrode 150 can be controlled to connect the first control unit 130 or the second control unit 140, and the first control unit 130 and the second control unit 140 respectively provide a scan signal to the first sensing electrodes 111 and the third sensing electrodes 121, or the first control unit 130 and the second control unit 140 respectively provide a scan signal to the second sensing electrodes 112 and the fourth sensing electrodes 122.

When the touch operation is occurred in the first sensing area 110 or the second sensing area 120, in step S202, for example, when the user's finger approaches the first sensing area 110 or the second sensing area 120, capacitance values between the first sensing electrodes 111 and the second sensing electrodes 112, or between the third sensing electrodes 121 and the fourth sensing electrodes 122 are changed due to the touch operation. The first control unit 130 and the second control unit 140 can calculate to obtain a touch trajectory corresponding to the touch operation according to a characteristic change, for example, a change of the capacitance values.

Further, in step S204, when the touch operation is started from a part of the first sensing electrodes 111 in the first sensing area 110 that is located adjacent to the second sensing area 120, the first control unit 130 can be further electrically connected to a part of the third sensing electrodes 121 located adjacent to the first sensing area 110 through the first switch 131, and the first control unit 130 can be connected to the border electrode 150 through the third switch 151, and the first control unit 130 can calculate to obtain the touch trajectory corresponding to the touch operation according to a characteristic change, for example, a change of the capacitance values, between the first sensing electrodes 111 and the second sensing electrodes 112, between the third sensing electrodes 121 and the second sensing electrodes 112, and the border electrode 150.

Moreover, in step S206, when the touch operation crosses over the middle axis A1 and enters the second sensing area 120 from the first sensing area 110, the second control unit 140 can be further electrically connected to a part of the first sensing electrodes 111 located adjacent to the second sensing area 120 through the second switch 141, the second control unit 140 can be connected to the border electrode 150 through the third switch 151, and the second control unit 140 can calculate to obtain the touch trajectory corresponding to the touch operation according to a characteristic change, for example, a change of the capacitance values, between the third sensing electrodes 121 and the fourth sensing electrodes 122, between the first sensing electrodes 111 and the fourth sensing electrodes 122, and the border electrode 150.

In the present embodiment, the first sensing area 110 and the second sensing area 120 of the touch panel 20 are spaced by the gap G, and the touch panel 20 is folded along the extending direction of the middle axis A1 to form the folding axis A2, and the folding axis A2 is located between the first sensing area 110 and the second sensing area 120, and the border electrode 150 is configured between the first sensing area 110 and the second sensing area 120. In this way, even if under a long time bending or folding usage, the touch panel 20 can still maintain integrity of the electrode structure and prevent the same from being damaged, so as to achieve better durability. Moreover, the sensing method adapted to the touch panel 20 is further provided, by which when the touch operation is started from a part of the first sensing electrodes 111 in the first sensing area 110 that is located adjacent to the second sensing area 120, the first control unit 130 can be further electrically connected to a part of the third sensing electrodes 121 located adjacent to the first sensing area 110 through the first switch 131, and the first control unit 130 can be connected to the border electrode 150 through the third switch 151, and the first control unit 130 can calculate to obtain the touch trajectory corresponding to the touch operation according to a characteristic change, for example, a change of the capacitance values, between the first sensing electrodes 111 and the second sensing electrodes 112, between the third sensing electrodes 121 and the second sensing electrodes 112, and the border electrode 150. When the touch operation crosses over the middle axis A1 and enters the second sensing area 120 from the first sensing area 110, the second control unit 140 can be further electrically connected to a part of the first sensing electrodes 111 located adjacent to the second sensing area 120 through the second switch 141, the second control unit 140 can be connected to the border electrode 150 through the third switch 151, and the second control unit 140 can calculate to obtain the touch trajectory corresponding to the touch operation according to a characteristic change, for example, a change of the capacitance values, between the third sensing electrodes 121 and the fourth sensing electrodes 122, between the first sensing electrodes 111 and the fourth sensing electrodes 122, and the border electrode 150. In this way, coordinates of the touch operations in the first sensing area 110, the second sensing area 120, and between the first sensing area 110 and the second sensing area 120 can be effectively sensed.

Figure 5:
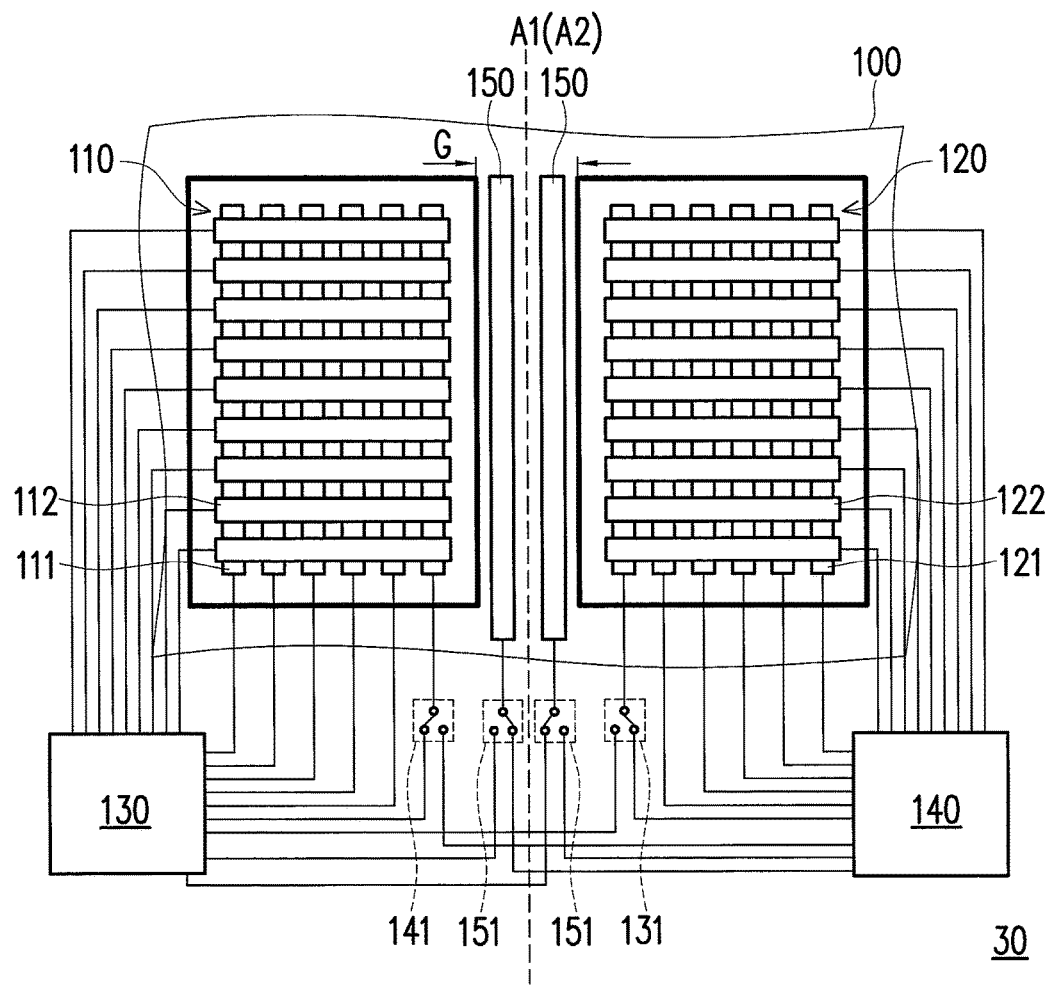
FIG. 5 is a schematic diagram of a touch panel according to still another embodiment of the disclosure.

FIG. 5 is a schematic diagram of a touch panel according to still another embodiment of the disclosure. Referring to FIG. 5, in the present embodiment, the touch panel 30 is similar to the touch panel 20, and the similar components are denoted by the same referential numbers and have similar functions, and details thereof are not repeated. A main difference between the touch panel 30 and the touch panel 20 is that the number of the border electrodes 150 and the number of the third switches 151 of the touch panel 30 are respectively two, and the border electrodes 150 and the middle axis A1 are arranged in interleaving.

It should be noticed that the numbers (two) of the border electrodes 150 and the third switches 151 shown in FIG. 5 are only an example, which are not used to be limiting of the disclosure, and the numbers of the border electrodes 150 and the third switches 151 can be three, four or more.

Figure 6:
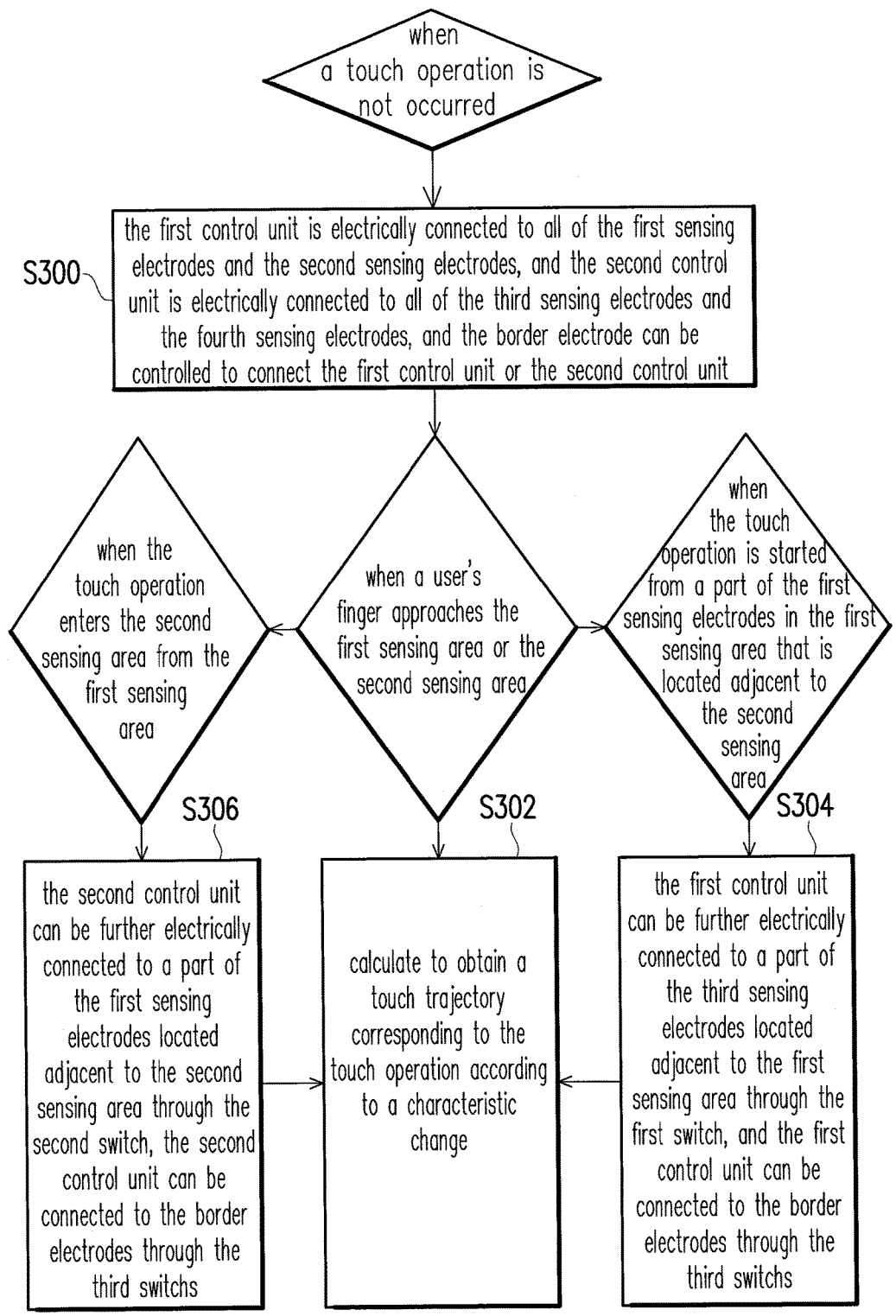
FIG. 6 is a flowchart illustrating a sensing method of the touch panel of FIG. 5.

FIG. 6 is a flowchart illustrating a sensing method of the touch panel of FIG. 5. Referring to FIG. 5 and FIG. 6, generally, when the touch operation is not occurred, in step S300, the first control unit 130 is electrically connected to all of the first sensing electrodes 111 and the second sensing electrodes 112, and the second control unit 140 is electrically connected to all of the third sensing electrodes 121 and the fourth sensing electrodes 122, and the border electrodes 150 can be controlled to connect the first control unit 130 or the second control unit 140, and the first control unit 130 and the second control unit 140 respectively provide a scan signal to the first sensing electrodes 111 or the second sensing electrodes 112 and the third sensing electrodes 121 or the fourth sensing electrodes 122.

When the touch operation is occurred in the first sensing area 110 or the second sensing area 120, in step S302, for example, when the user's finger approaches the first sensing area 110 or the second sensing area 120, capacitance values between the first sensing electrodes 111 and the second sensing electrodes 112, or between the third sensing electrodes 121 and the fourth sensing electrodes 122 are changed due to the touch operation. The first control unit 130 and the second control unit 140 can calculate to obtain a touch trajectory corresponding to the touch operation according to a characteristic change, for example, a change of the capacitance values.

Further, in step S304, when the touch operation is started from a part of the first sensing electrodes 111 in the first sensing area 110 that is located adjacent to the second sensing area 120, the first control unit 130 can be further electrically connected to a part of the third sensing electrodes 121 located adjacent to the first sensing area 110 through the first switch 131, and the first control unit 130 can be connected to the border electrodes 150 through the third switches 151, and the first control unit 130 can calculate to obtain the touch trajectory corresponding to the touch operation according to a characteristic change, for example, a change of the capacitance values, between the first sensing electrodes 111 and the second sensing electrodes 112, between the third sensing electrodes 121 and the second sensing electrodes 112, and between the border electrodes 150.

Moreover, in step S306, when the touch operation crosses over the middle axis A1 and enters the second sensing area 120 from the first sensing area 110, the second control unit 140 can be further electrically connected to a part of the first sensing electrodes 111 located adjacent to the second sensing area 120 through the second switch 141, the second control unit 140 can be connected to the border electrodes 150 through the third switches 151, and the second control unit 140 can calculate to obtain the touch trajectory corresponding to the touch operation according to a characteristic change, for example, a change of the capacitance values, between the third sensing electrodes 121 and the fourth sensing electrodes 122, between the first sensing electrodes 111 and the fourth sensing electrodes 122, and between the border electrodes 150.

In the present embodiment, the first sensing area 110 and the second sensing area 120 of the touch panel 30 are spaced by the gap G, and the touch panel 30 is folded along the extending direction of the middle axis A1 to form the folding axis A2, and the folding axis A2 and the border electrodes 150 are configured between the first sensing area 110 and the second sensing area 120, and the border electrodes 150 and the folding axis A2 are disposed in interleaving. In this way, even if under a long time bending or folding usage, the touch panel 30 can still maintain integrity of the electrode structure and prevent the same from being damaged, so as to achieve better durability. Moreover, the sensing method adapted to the touch panel 30 is further provided, by which when the touch operation is started from a part of the first sensing electrodes 111 in the first sensing area 110 that is located adjacent to the second sensing area 120, the first control unit 130 can be further electrically connected to a part of the third sensing electrodes 121 located adjacent to the first sensing area 110 through the first switch 131, and the first control unit 130 can be connected to the border electrodes 150 through the third switches 151, and the first control unit 130 can calculate to obtain the touch trajectory corresponding to the touch operation according to a characteristic change, for example, a change of the capacitance values, between the first sensing electrodes 111 and the second sensing electrodes 112, between the third sensing electrodes 121 and the second sensing electrodes 112, and between the border electrodes 150. When the touch operation crosses over the middle axis A1 and enters the second sensing area 120 from the first sensing area 110, the second control unit 140 can be further electrically connected to a part of the first sensing electrodes 111 located adjacent to the second sensing area 120 through the second switch 141, the second control unit 140 can be connected to the border electrodes 150 through the third switches 151, and the second control unit 140 can calculate to obtain the touch trajectory corresponding to the touch operation according to a characteristic change, for example, a change of the capacitance values, between the third sensing electrodes 121 and the fourth sensing electrodes 122, between the first sensing electrodes 111 and the fourth sensing electrodes 122, and between the border electrodes 150. In this way, coordinates of the touch operations in the first sensing area 110, the second sensing area 120, and between the first sensing area 110 and the second sensing area 120 can be effectively sensed.

Besides, according to the embodiments of FIG. 1, FIG. 3 and FIG. 5, the first control unit 130 and the second control unit 140 can be respectively connected to a microcontroller (MCU) (not shown), where the first control unit 130, the second control unit 140 and the microcontroller can be integrated in a same integrated circuit (IC) or different ICs. Particularly, when the first control unit 130, the second control unit 140 and the microcontroller are integrated in the same IC, the number of used ICs and the number of the peripheral electronic devices are reduced, and a circuit board area is reduced.

Figure 7:
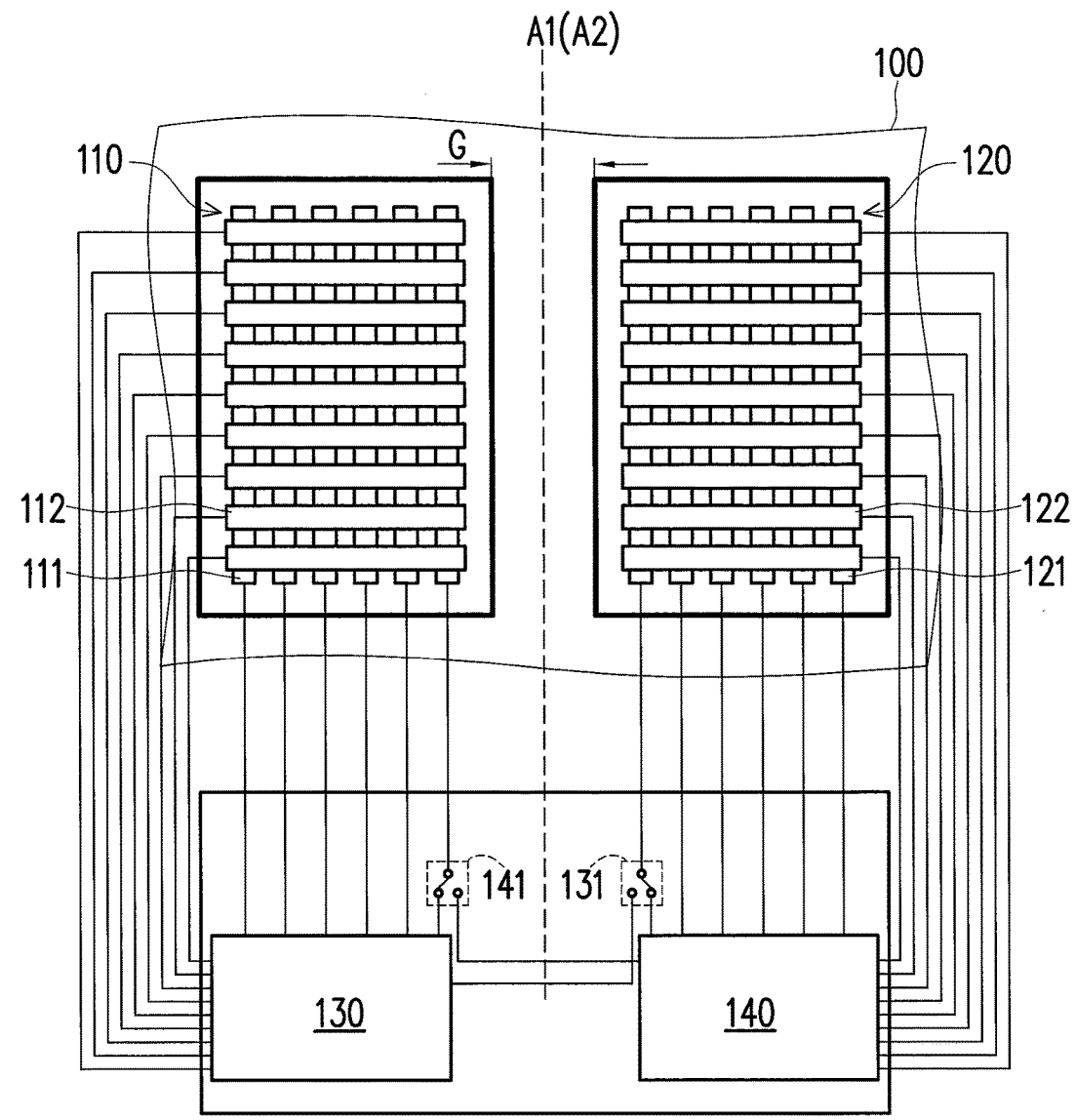
FIG. 7 is a schematic diagram of a touch panel according to another embodiment of the disclosure.

In detail, FIG. 7 is a schematic diagram of a touch panel according to another embodiment of the disclosure. Referring to FIG. 7, in the present embodiment, the touch panel 40 is similar to the touch panel 10, and the similar components are denoted by the same referential numbers and have similar functions, and details thereof are not repeated. A main difference between the touch panel 40 and the touch panel 10 is that the first switch 131, the second switch 141, the first control unit 130, the second control unit 140 and the microcontroller (not shown) of the touch panel 40 are integrated in a same IC.

Figure 8:
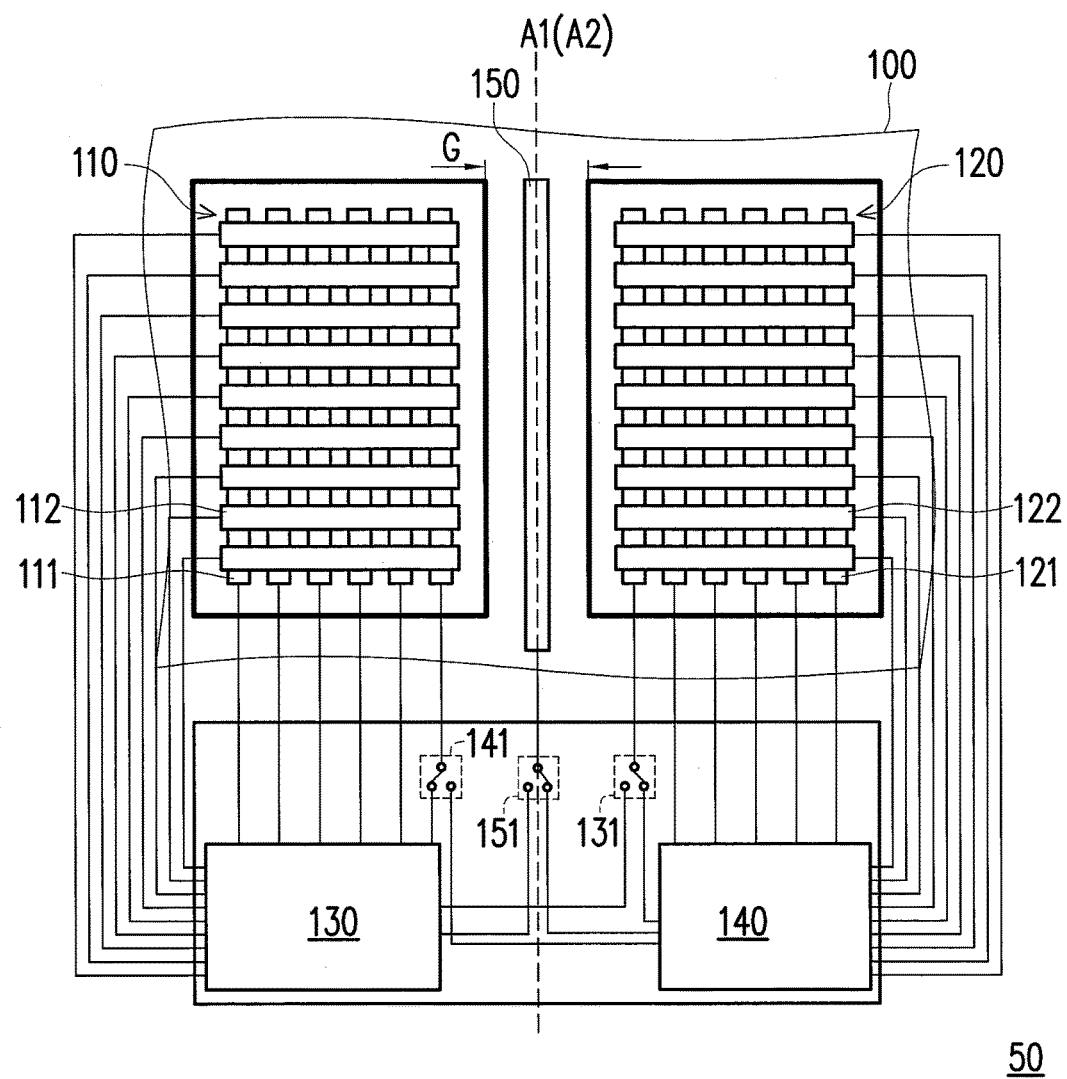
FIG. 8 is a schematic diagram of a touch panel according to still another embodiment of the disclosure.

Moreover, FIG. 8 is a schematic diagram of a touch panel according to still another embodiment of the disclosure. Referring to FIG. 8, in the present embodiment, the touch panel 50 is similar to the touch panel 20, and the similar components are denoted by the same referential numbers and have similar functions, and details thereof are not repeated. A main difference between the touch panel 50 and the touch panel 20 is that the first switch 131, the second switch 141, the third switch 151, the first control unit 130, the second control unit 140 and the microcontroller (not shown) of the touch panel 50 are integrated in a same IC.

Figure 9:
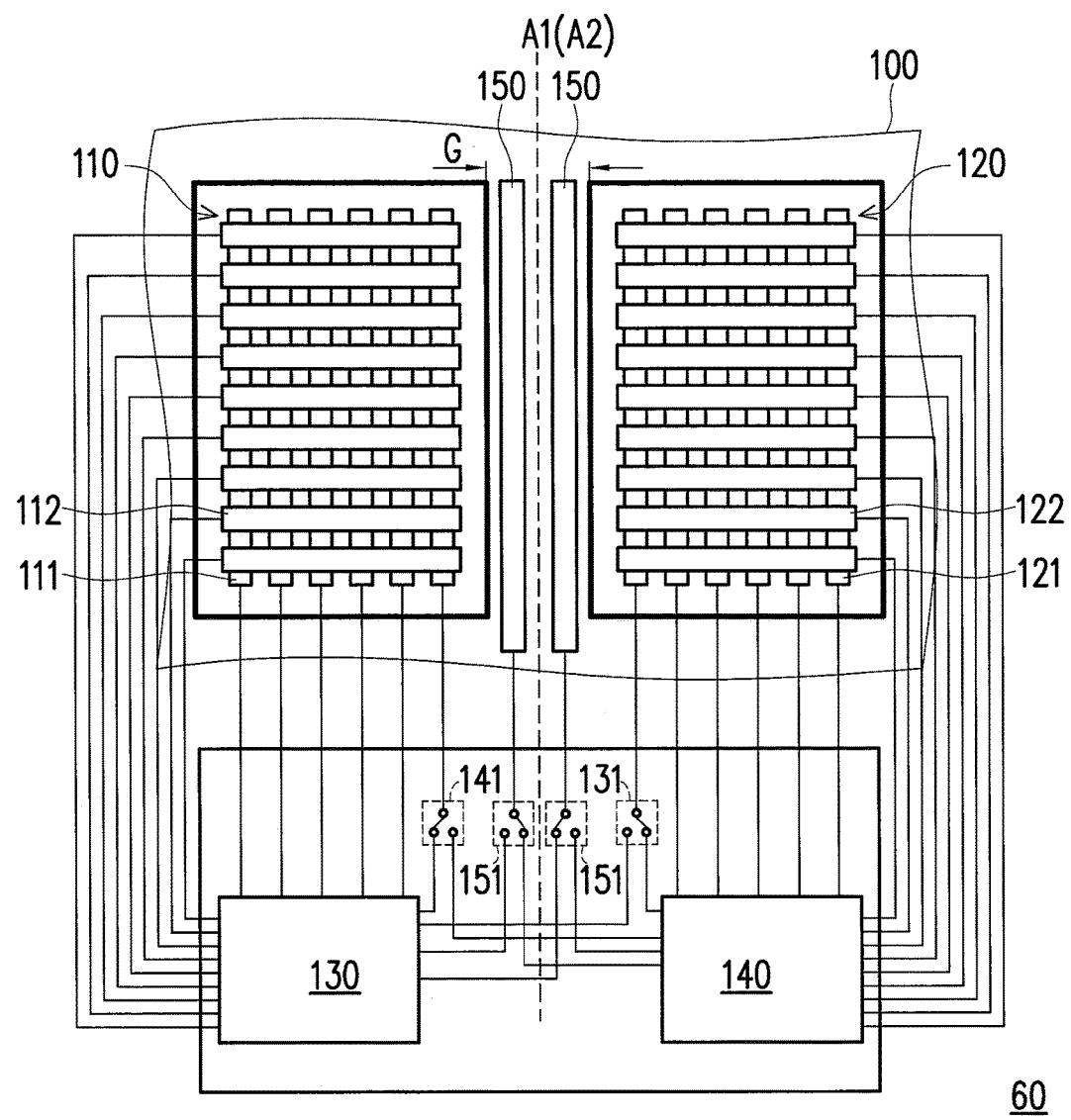
FIG. 9 is a schematic diagram of a touch panel according to still another embodiment of the disclosure.

In addition, FIG. 9 is a schematic diagram of a touch panel according to still another embodiment of the disclosure.

Referring to FIG. 9, in the present embodiment, the touch panel 60 is similar to the touch panel 30, and the similar components are denoted by the same referential numbers and have similar functions, and details thereof are not repeated. A main difference between the touch panel 60 and the touch panel 30 is that the first switch 131, the second switch 141, the third switches 151, the first control unit 130, the second control unit 140 and the microcontroller (not shown) of the touch panel 60 are integrated in a same IC.

Further, the first sensing electrode 111 and the corresponding third sensing electrode 121 in the embodiments of FIG. 1, FIG. 3, FIG. 5, FIG. 7 and FIG. 9 can be connected to a same pin of the first control unit 130. In this way, a pin usage number of the IC is decreased by a half.

Figure 10:
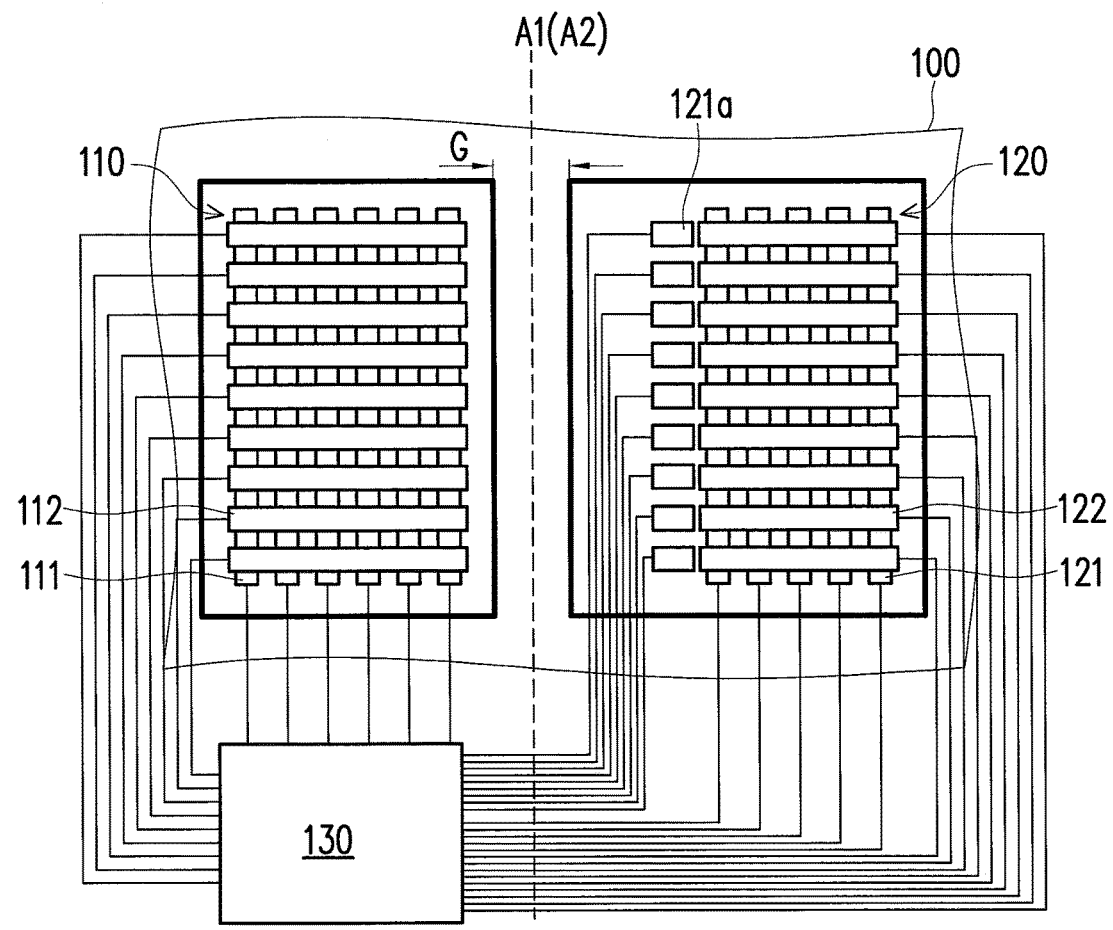
FIG. 10 is a schematic diagram of a touch panel according to still another embodiment of the disclosure.

FIG. 10 is a schematic diagram of a touch panel according to still another embodiment of the disclosure. Referring to FIG. 10, in the present embodiment, the touch panel 70 is similar to the touch panel 10, and the similar components are denoted by the same referential numbers and have similar functions, and details thereof are not repeated. A main difference between the touch panel 70 and the touch panel 10 is that the third sensing electrode 121 located adjacent to the first sensing area 110 can be divided into a plurality of sub third sensing electrodes 121a, and the sub third sensing electrodes 121a are independent to each other, and the first control unit 130 is electrically connected to the first sensing electrodes 111 and the second sensing electrodes 112. Particularly, the first control unit 130 is electrically connected to the third sensing electrodes 121, the sub third sensing electrodes 121a and the fourth sensing electrodes 122.

Figure 11:
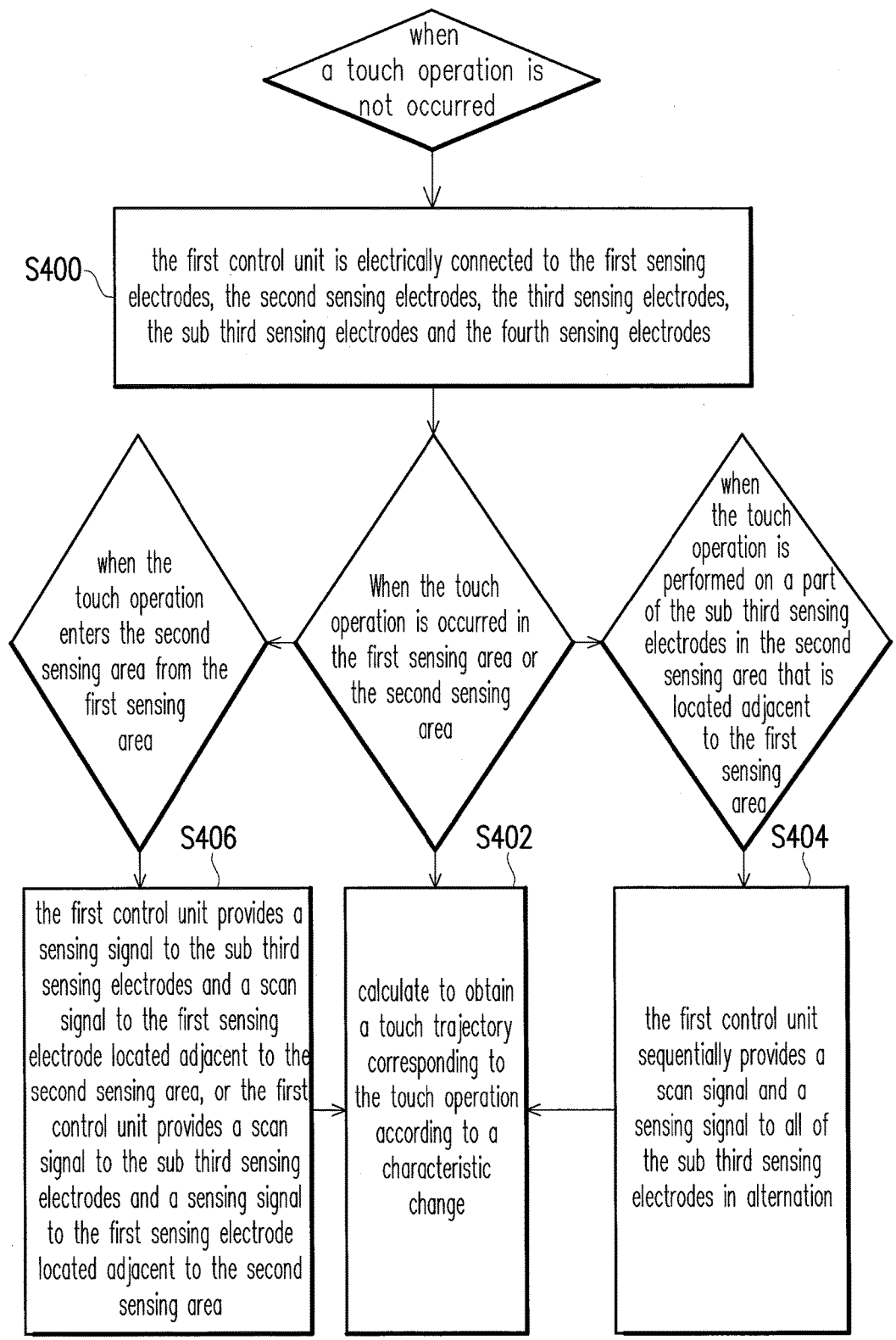
FIG. 11 is a flowchart illustrating a sensing method for the touch panel of FIG. 10.

FIG. 11 is a flowchart illustrating a sensing method for the touch panel of FIG. 10. Referring to FIG. 10 and FIG. 11, generally, when a touch operation is not occurred, in step S400, the first control unit 130 provides a scan signal to the first sensing electrodes 111, the third sensing electrodes 121 and the sub third sensing electrodes 121a, or the first control unit 130 provides a scan signal to the second sensing electrodes 112 and the fourth sensing electrodes 122, and the sub third sensing electrodes 121a sequentially receive a scan signal and a sensing signal in alternation.

When the touch operation is occurred in the first sensing area 110 or the second sensing area 120, in step S402, for example, when the user's finger approaches the first sensing area 110 or the second sensing area 120, capacitance values between the first sensing electrodes 111 and the second sensing electrodes 112, between the third sensing electrodes 121 and the fourth sensing electrodes 122, between the sub third sensing electrodes 121a and the fourth sensing electrodes 122, or self-capacitances of the sub third sensing electrodes 121a are changed due to the touch operation. The first control unit 130 can calculate to obtain a touch trajectory corresponding to the touch operation according to a characteristic change, for example, a change of the capacitance values. In other words, the first control unit 130 of the present embodiment can calculate to obtain the touch trajectory corresponding to the touch operation according to a characteristic change, for example, a self-capacitive or mutual capacitive sensing method.

Further, in the present embodiment, in step S404, when the touch operation is performed on a part of the sub third sensing electrodes 121a in the second sensing area 120 that is located adjacent to the first sensing area 110, the first control unit 130 sequentially provides a scan signal and a sensing signal to all of the sub third sensing electrodes 121a in alternation. The first control unit 130 can calculate to obtain a touch trajectory corresponding to the touch operation according to a characteristic change, for example, a change of capacitance values, between the first sensing electrodes 111 and the second sensing electrodes 112, between the third sensing electrodes 121 and the fourth sensing electrodes 122, between the sub third sensing electrodes 121a and the third sensing electrodes 121, between the sub third sensing electrodes 121a and the fourth sensing electrodes 122, or self-capacitances of the sub third sensing electrodes 121a. In other words, the first control unit 130 of the present embodiment can calculate to obtain the touch trajectory corresponding to the touch operation according to a characteristic change, for example, a self-capacitive or mutual capacitive sensing method.

Moreover, in step S406, when the touch operation enters the second sensing area 120 from the first sensing area 110, the first control unit 130 provides a sensing signal to the sub third sensing electrodes 121a and a scan signal to the first sensing electrode 111 located adjacent to the second sensing area 120, or the first control unit 130 provides a scan signal to the sub third sensing electrodes 121a and a sensing signal to the first sensing electrode 111 located adjacent to the second sensing area 120. The first control unit 130 can calculate to obtain a touch trajectory corresponding to the touch operation according to a characteristic change, for example, a change of capacitance values, between the first sensing electrodes 111 and the second sensing electrodes 112, between the third sensing electrodes 121 and the fourth sensing electrodes 122, between the sub third sensing electrodes 121a and the first sensing electrode 111 located adjacent to the second sensing area 120, or self-capacitances of the sub third sensing electrodes 121a. In other words, the first control unit 130 of the present embodiment can calculate to obtain the touch trajectory corresponding to the touch operation according to a characteristic change, for example, a self-capacitive or mutual capacitive sensing method.

In the present embodiment, the first sensing area 110 and the second sensing area 120 of the touch panel 70 are spaced by the gap G, and the touch panel 70 is folded along the extending direction of the middle axis A1 to form the folding axis A2, and the folding axis A2 is located between the first sensing area 110 and the second sensing area 120, and the third sensing electrode 121 located adjacent to the first sensing area 110 is divided into a plurality of sub third sensing electrodes 121a. In this way, even if under a long time bending or folding usage, the touch panel 70 can still maintain integrity of the electrode structure and prevent the same from being damaged, so as to achieve better durability. Moreover, the sensing method adapted to the touch panel 70 is further provided, by which when the touch operation is started from a part of the sub third sensing electrodes 121a in the second sensing area 120 that is located adjacent to the first sensing area 110, the first control unit 130 sequentially provide the scan signal and the sensing to all of the sub third sensing electrodes 121a in alternation. The first control unit 130 can calculate to obtain a touch trajectory corresponding to the touch operation according to a characteristic change, for example, a change of capacitance values, between the first sensing electrodes 111 and the second sensing electrodes 112, between the third sensing electrodes 121 and the fourth sensing electrodes 122, between the sub third sensing electrodes 121a and the third sensing electrodes 121, between the sub third sensing electrodes 121a and the fourth sensing electrodes 122, or self-capacitances of the sub third sensing electrodes 121a. When the touch operation enters the second sensing area 120 from the first sensing area 110, the first control unit 130 provides a sensing signal to the sub third sensing electrodes 121a and a scan signal to the first sensing electrode 111 located adjacent to the second sensing area 120, or the first control unit 130 provides a scan signal to the sub third sensing electrodes 121a and a sensing signal to the first sensing electrode 111 located adjacent to the second sensing area 120. The first control unit 130 can calculate to obtain a touch trajectory corresponding to the touch operation according to a characteristic change, for example, a change of capacitance values, between the first sensing electrodes 111 and the second sensing electrodes 112, between the third sensing electrodes 121 and the fourth sensing electrodes 122, between the sub third sensing electrodes 121a and the first sensing electrode 111 located adjacent to the second sensing area 120, or self-capacitances of the sub third sensing electrodes 121a.

Figure 12A:
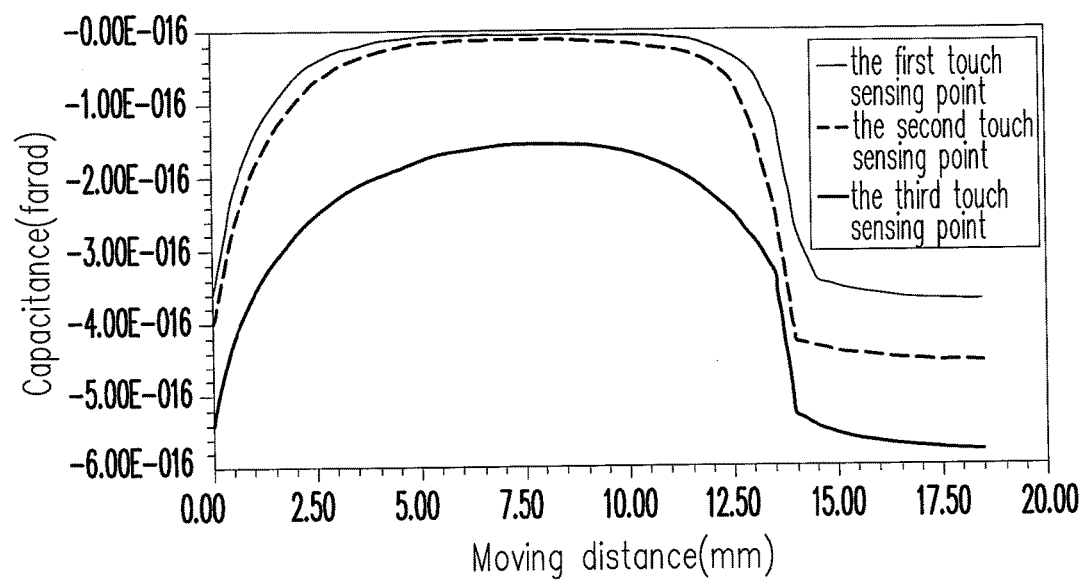
FIG. 12A and FIG. 12B are sensing simulation results of the touch panel of FIG. 10.
Figure 12B:
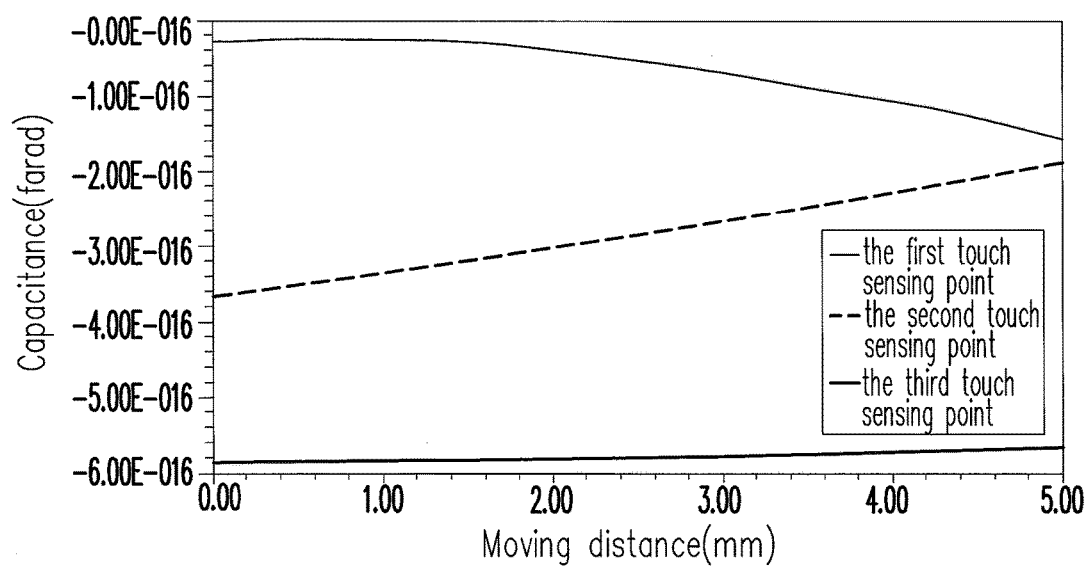

For example, FIG. 12A and FIG. 12B are sensing simulation results of the touch panel 70 of FIG. 10, where FIG. 12A illustrates a situation that the user simultaneously touches three points of the touch panel 70, and the touch operation enters the second sensing area 120 from the first sensing area 110, and FIG. 12B illustrates a situation that the user touches a single point of the touch panel 70, and the touch operation is executed between the first sensing area 110 and the second sensing area 120, in which a vertical axis represents capacitance values sensed through a mutual capacitive method, and a horizontal axis represents a moving distance of the touch operation, and different lines respectively represent different touch sensing points. Referring to FIG. 10, FIG. 12A and FIG. 12B, in the simulation result, by configuring the sub third sensing electrodes 121a in collaboration with the sensing signal, the first control unit 130 provides a sensing signal to the sub third sensing electrodes 121a and a scan signal to the first sensing electrode 111 located adjacent to the second sensing area 120, or the first control unit 130 provides a scan signal to the sub third sensing electrodes 121a and a sensing signal to the first sensing electrode 111 located adjacent to the second sensing area 120, and regardless of the situation of a multi touch or a single touch, the situation that the touch operation enters the second sensing area 120 from the first sensing area 110, or the situation that the touch operation is executed between the first sensing area 110 and the second sensing area 120, the first control unit 130 can calculate to obtain the touch trajectory of the touch operation according to a characteristic change, for example, a change of capacitance values, between the first sensing electrodes 111 and the second sensing electrodes 112, between the third sensing electrodes 121 and the fourth sensing electrodes 122, or between the sub third sensing electrodes 121a and the first sensing electrode 111 located adjacent to the second sensing area 120.

Figure 13:
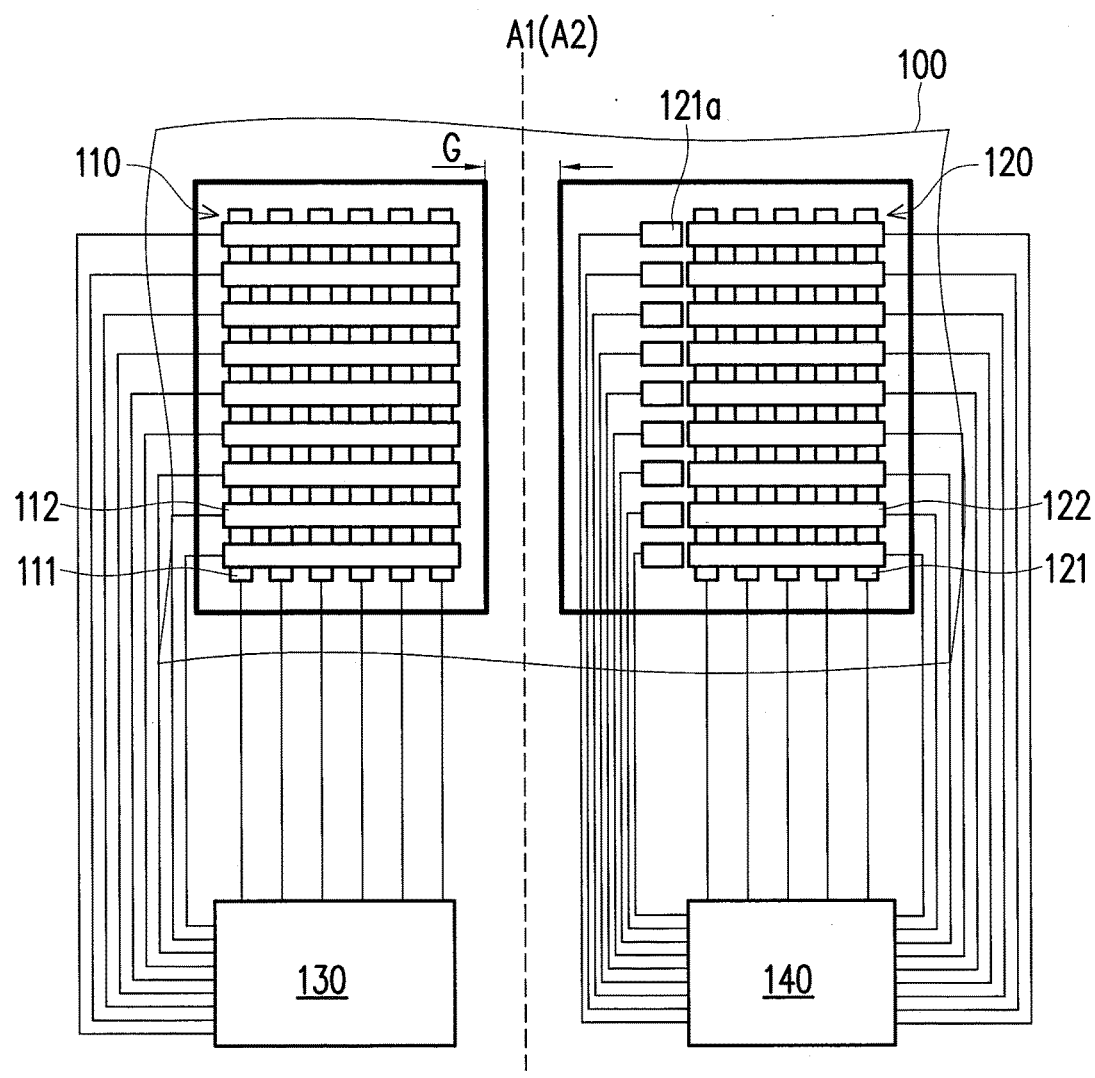
FIG. 13 is a schematic diagram of a touch panel according to still another embodiment of the disclosure.

FIG. 13 is a schematic diagram of a touch panel according to still another embodiment of the disclosure. Referring to FIG. 13, in the present embodiment, the touch panel 80 is similar to the touch panel 70, and the similar components are denoted by the same referential numbers and have similar functions, and details thereof are not repeated. A main difference between the touch panel 80 and the touch panel 70 is that the first sensing electrodes 111 and the second sensing electrodes 112 are controlled by the same first control unit 130. On the other hand, the third sensing electrodes 121, the sub third sensing electrodes 121a and the fourth sensing electrodes 122 are controlled by the second control unit 140. When the first sensing electrodes 111 and the second sensing electrodes 112 are controlled by the same first control unit 130, and the third sensing electrodes 121 and the fourth sensing electrodes 122 are controlled by the second control unit 140, the number of used ICs and the number of the peripheral electronic devices are reduced, and a circuit board area is reduced.

Figure 14:
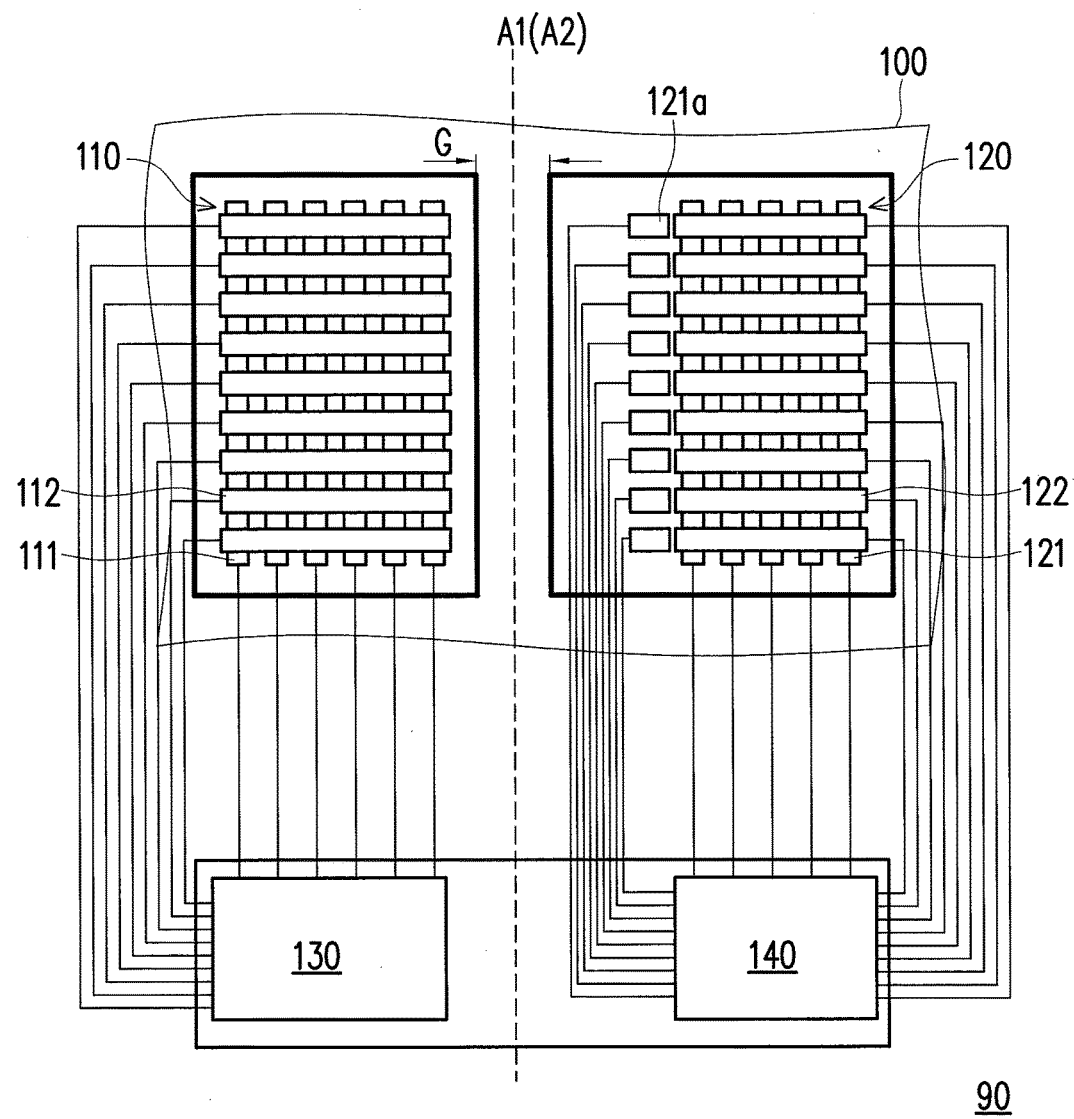
FIG. 14 is a schematic diagram of a touch panel according to still another embodiment of the disclosure.

Besides, FIG. 14 is a schematic diagram of a touch panel according to still another embodiment of the disclosure. Referring to FIG. 14, in the present embodiment, the touch panel 90 is similar to the touch panel 80, and the similar components are denoted by the same referential numbers and have similar functions, and details thereof are not repeated. A main difference between the touch panel 90 and the touch panel 80 is that the first control unit 130, the second control unit 140 and the microcontroller (not shown) in the touch panel 90 are integrated into a same IC.

Further, according to the aforementioned embodiments of FIG. 10, FIG. 13 and FIG. 14, the first sensing electrode 111 and the corresponding third sensing electrode 121 can be connected to a same pin of the first control unit 130, and the second sensing electrode 112 and the fourth sensing electrode 122 can be connected to a same pin of the first control unit 130. In this way, a pin usage number of the IC is decreased by a half.

In summary, the first sensing area and the second sensing area of the touch panel of the disclosure are spaced by a gap, and the touch panel is folded along the extending direction of the middle axis to form a folding axis, and the folding axis is located between the first sensing area and the second sensing area. In this way, the touch panel still maintains integrity of the electrode structures and prevent the same from being damaged under a long time bending or folding usage, so as to achieve better durability. Moreover, when the touch operation is started from a part of the first sensing electrodes in the first sensing area that is located adjacent to the second sensing area, the first control unit can calculate to obtain the touch trajectory corresponding to the touch operation according to a characteristic change, for example, a change of the capacitance values, between the first sensing electrodes and the second sensing electrodes, and between the third sensing electrodes and the second sensing electrodes. When the touch operation crosses over the middle axis and enters the second sensing area from the first sensing area, the second control unit can calculate to obtain the touch trajectory corresponding to the touch operation according to a characteristic change, for example, a change of the capacitance values, between the third sensing electrodes and the fourth sensing electrodes, and between the first sensing electrodes and the fourth sensing electrodes. Besides, if the touch panel further includes a border electrode disposed between the first sensing area and the second sensing area along a direction parallel to the extending direction of the middle axis, when the touch operation is started from a part of the first sensing electrodes in the first sensing area that is located adjacent to the second sensing area, the first control unit can be connected to the border electrode through the third switch, and the first control unit can calculate to obtain the touch trajectory corresponding to the touch operation according to a characteristic change, for example, a change of the capacitance values, between the first sensing electrodes and the second sensing electrodes, between the third sensing electrodes and the second sensing electrodes, and between the border electrodes. When the touch operation crosses over the middle axis and enters the second sensing area from the first sensing area, the second control unit can calculate to obtain the touch trajectory corresponding to the touch operation according to a characteristic change, for example, a change of the capacitance values, between the third sensing electrodes and the fourth sensing electrodes, between the first sensing electrodes and the fourth sensing electrodes, and between the border electrodes. Further, if the touch panel further includes a plurality of border electrodes extendedly disposed between the first sensing area and the second sensing area along a direction parallel to the extending direction of the middle axis, and the border electrodes and the middle axis are interleaved, when the touch operation is started from a part of the first sensing electrodes in the first sensing area that is located adjacent to the second sensing area, the first control unit can be connected to the border electrodes through the third switches, and the first control unit can calculate to obtain the touch trajectory corresponding to the touch operation according to a characteristic change, for example, a change of the capacitance values, between the first sensing electrodes and the second sensing electrodes, between the third sensing electrodes and the second sensing electrodes, and between the border electrodes. When the touch operation crosses over the middle axis and enters the second sensing area from the first sensing area, the second control unit can calculate to obtain the touch trajectory corresponding to the touch operation according to a characteristic change, for example, a change of the capacitance values, between the third sensing electrodes and the fourth sensing electrodes, between the first sensing electrodes and the fourth sensing electrodes, and between the border electrodes.

Moreover, when the touch panel divides the third sensing electrode located adjacent to the first sensing area into a plurality of sub third sensing electrodes, if the touch operation is started from a part of the sub third sensing electrodes in the second sensing area that is located adjacent to the first sensing area, the sub third sensing electrodes sequentially receive a scan signal and a sensing signal in alternation. The first control unit can calculate to obtain a touch trajectory corresponding to the touch operation according to a characteristic change, for example, a change of capacitance values, between the first sensing electrodes and the second sensing electrodes, between the third sensing electrodes and the fourth sensing electrodes, between the sub third sensing electrodes and the third sensing electrodes, between the sub third sensing electrodes and the fourth sensing electrodes, or self-capacitances of the sub third sensing electrodes. When the touch operation enters the second sensing area from the first sensing area, the sub third sensing electrodes and the first sensing electrode located adjacent to the second sensing area respectively receive the sensing signal or the scan signal. The first control unit can calculate to obtain a touch trajectory corresponding to the touch operation according to a characteristic change, for example, a change of capacitance values, between the first sensing electrodes and the second sensing electrodes, between the third sensing electrodes and the fourth sensing electrodes, between the sub third sensing electrodes and the first sensing electrode, or self-capacitances of the sub third sensing electrodes.

It will be apparent to those skilled in the art that various modifications and variations can be made to the structure of the disclosure without departing from the scope or spirit of the disclosure. In view of the foregoing, it is intended that the disclosure cover modifications and variations of this disclosure provided they fall within the scope of the following claims and their equivalents.

What is claimed is:

1. A touch panel, comprising:
   a substrate, having a first sensing area, a second sensing area and a middle axis, wherein the first sensing area and the second sensing area are spaced by a gap, and the middle axis is configured between the first sensing area and the second sensing area;

a plurality of first sensing electrodes and a plurality of second sensing electrodes, extendedly disposed in the first sensing area, wherein the first sensing electrodes and the second sensing electrodes are intersected to each other, and the first sensing electrodes are disposed along an extending direction of the middle axis;

a plurality of third sensing electrodes and a plurality of fourth sensing electrodes, extendedly disposed in the second sensing area, wherein the third sensing electrodes and the fourth sensing electrodes are intersected to each other, and the third sensing electrodes are disposed along the extending direction of the middle axis;

a first control unit, electrically connected to the first sensing electrodes and the second sensing electrodes, electrically isolated from the fourth sensing electrodes, and selectively electrically connected to a fixed part of the third sensing electrodes located adjacent to the first sensing area; and a second control unit, electrically connected to the third sensing electrodes and the fourth sensing electrodes, electrically isolated from the second sensing electrodes, and selectively electrically connected to a fixed part of the first sensing electrodes located adjacent to the second sensing area, wherein when the first control unit is selectively electrically connected to the fixed part of the third sensing electrodes located adjacent to the first sensing area, the first control unit calculates a change of capacitance values between the fixed part of the third sensing electrodes and the second sensing electrodes, and when the second control unit is selectively electrically connected to the fixed part of the first sensing electrodes located adjacent to the second sensing area, the second control unit calculates a change of capacitance values between the fixed part of the first sensing electrodes and the fourth sensing electrodes.

2. The touch panel as claimed in claim 1, wherein the touch panel is folded along the extending direction of the middle axis to form a folding axis, and the folding axis is located between the first sensing area and the second sensing area.

3. The touch panel as claimed in claim 1, further comprising at least one first switch and at least one second switch, wherein the first control unit is selectively electrically connected to a fixed part of the third sensing electrodes through the first switch, and the second control unit is selectively electrically connected to a fixed part of the first sensing electrodes through the second switch.

4. The touch panel as claimed in claim 1, further comprising at least one border electrode and at least one third switch, wherein the border electrode is disposed parallel to the extending direction of the middle axis, and is located between the first sensing area and the second sensing area, and the border electrode is selectively connected to the first control unit or the second control unit through the third switch.

5. The touch panel as claimed in claim 4, wherein the border electrode and the middle axis are interleaved.

* * * * *